July 15, 1947.   G. C. STEWART   2,424,065
PLOTTING INSTRUMENT
Filed March 17, 1944   2 Sheets-Sheet 1

INVENTOR.
George C. Stewart,
BY George D. Richards,
ATTORNEY.

July 15, 1947.  G. C. STEWART  2,424,065
PLOTTING INSTRUMENT
Filed March 17, 1944  2 Sheets-Sheet 2

INVENTOR.
George C. Stewart,
BY
ATTORNEY.

Patented July 15, 1947

2,424,065

UNITED STATES PATENT OFFICE 2,424,065

PLOTTING INSTRUMENT

George C. Stewart, Caldwell, N. J.

Application March 17, 1944, Serial No. 526,930

2 Claims. (Cl. 33—1)

This invention relates to improvements in geometrical instruments; and the invention has reference, more particularly, to a novel plotting instrument for use in plotting surveyor's notes, land deed descriptions, engineering data, marine and air navigation courses, and for similar uses.

The invention has for an object to provide a novel instrument for making protractions of various kinds comprising different angles and bearings, and whereby said angles and bearings may be read and plotted from point to point in a rapid and convenient manner, and with no risk of accumulative error.

The invention has for a further object to provide a novel plotting instrument for the purposes stated, comprising a rectangular protractor body, preferably equi-lateral, having a central circular opening therein, and a semi-circular adjustable element rotatively movable within and around said opening, said latter element having a diametric straight or ruling edge provided with a center point determining means, such e. g. as a mark, indentation or notch, at its middle and pivotal point; the face of said protractor body being divided into quadrants by a central perpendicular axis extending between its top and bottom sides and a central transverse axis extending between its lateral sides, said axes intersecting the center or pivotal point of the rotative element, whereby terminals of said axes provide a north rhumb at the top of said protractor body, an east rhumb at the right hand side thereof, a south rhumb at the bottom thereof, and a west rhumb at the left hand side thereof; the quadrants of said protractor body being provided with graduations inscribed around the marginal portions of the body opening to read in degrees of a circle, ninety degrees right and left from the respective zero points established by the north and south rhumbs, relative to which graduations the diametric straight or ruling edge of the rotative element may be moved and selectively positioned during operation of the instrument in use.

Other objects of this invention, not at this time more particularly enumerated, will be understood from the following detailed description of the same.

An illustrative embodiment of this invention is shown in the accompanying drawings, in which.

Similar characters of reference are employed in the above described views, to indicate corresponding parts.

Figure 1:
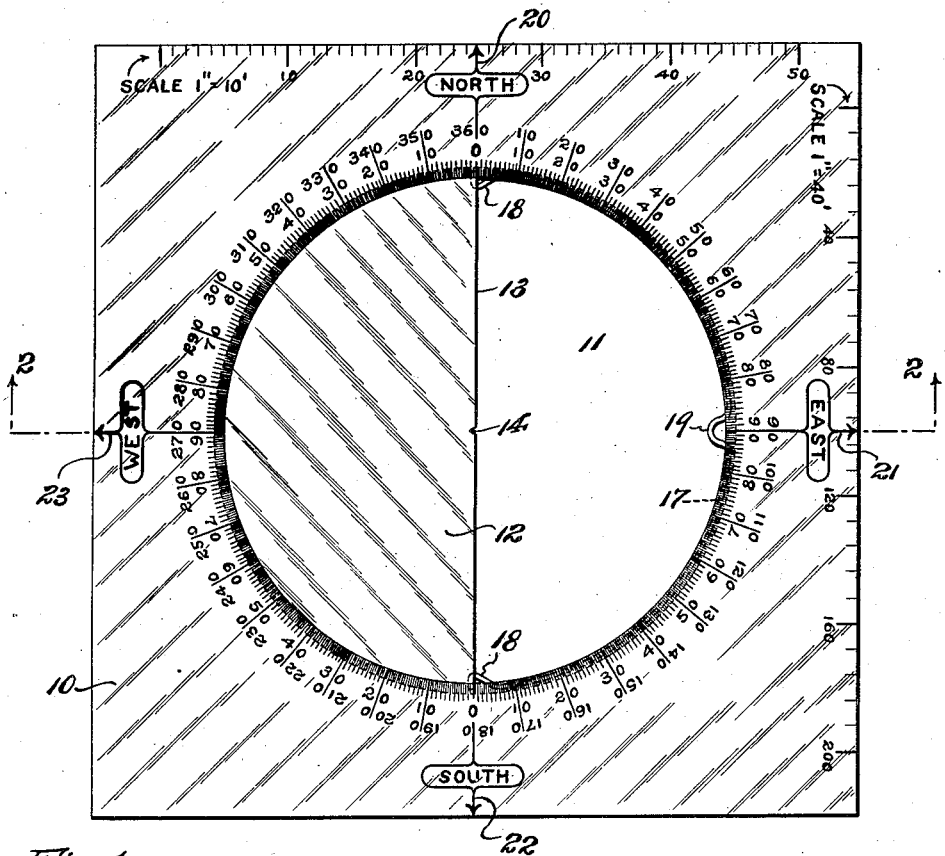
Fig. 1 is an obverse face view of the novel plotting instrument made according to this invention.
Figure 2:
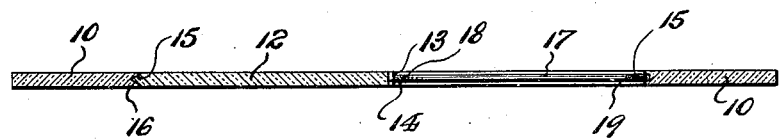
Fig. 2 is a transverse sectional view thereof, taken on line 2—2 in Fig. 1.

The novel plotting instrument of this invention, in a preferred embodiment thereof, comprises a rectangular protractor body 10, of preferably equi-lateral form. The interior of said body 10 is cut away to provide a central circular opening 11 of substantial size; preferably said opening is of a diameter equal to two-thirds, approximately, of the lateral dimension of the body. Arranged within said opening 11, subject to adjustive rotative movement in the plane of said body within and around the perimeter of said opening, is a semi-circular adjustable element or rotor member 12, the same having a diametric straight or ruling edge 13 provided with a center point indicating means 14, such e. g. as a mark, at its middle and coincident to the central point of the body opening 11, and consequently with the pivotal point about which said rotor member may be turned.

Said protractor body 10 and the associated rotor member 12 may be made of any suitable, comparatively thin, sheet material; it is preferably made, however, of pyroxylin or similar plastic material, and preferably of a transparent type of such material.

The rotor member may be assembled with and held in rotative relation to said protractor body in any suitable manner. One means for so assembling and relating the rotor member to the protractor body comprises the provision of a guide channel or groove 15 in and entirely around the perimeter of the opening 11 of the latter. The circumferential edge of the rotor member 12 is provided with a runner portion 16 shaped to enter and slide in said guide channel or groove 15. Means is provided for thrusting the rotor member toward the perimeter of the protractor body opening 11, whereby to maintain engagement of the runner portion 16 of the former with the guide channel or groove 15 of the latter, and in such manner that, although permitting relative sliding movement of these parts, when said rotor member is manipulated for rotative movement and adjustment thereof, sufficient friction is induced whereby the rotor member tends to normally hold any position to which it has been moved against accidental displacement therefrom. To this end, an arcuate keeper spring 17 is lodged in the guide channel or groove 15 in the perimeter of the protractor body opening in opposition to the rotor member 12; said spring having, respectively at its opposite ends, angular foot pieces 18, which thrustingly bear respectively against opposite end portions of the straight or ruling edge 13 of said rotor member. The spring 17 may be provided intermediate its ends with a finger piece forming loop 19, to project freely into the central opening 11, and thus accessible for use for imparting rotative adjusting movement to the rotor member 12.

The face of the protractor body is subdivided into quadrants delimited by coordinate perpendicular and transverse central axes intersecting the center point of the protractor body opening and pivot of rotor member movement, and respectively extending between top and bottom sides and between lateral sides of said protractor body. Rhumb lines and identifications thereof are inscribed on the face of the protractor body coincident to said axes, whereby to provide a north rhumb line 20 at the top of said protractor body, an east rhumb line 21 at the right hand side of said body, a south rhumb line 22 at the bottom of said body, and a west rhumb line 23 at the left hand side of said body.

The quadrants of said protractor body are each provided with graduated scales inscribed around the marginal portions of the body opening 11 measured in degrees of a circle, including subdivisions of degrees if desired, whereby each quadrant comprehends ninety degrees. The upper right hand quadrant is provided with a ninety degree scale reading clockwise from 0 at the north rhumb line 20 to 90 at the east rhumb line 21. The upper left hand quadrant is provided with a ninety degree scale reading counter-clockwise from 0 at the north rhumb line 20 to 90 at the west rhumb line 23. The lower right hand quadrant is provided with a ninety degree scale reading counter-clockwise from 0 at the south rhumb line 22 to 90 at the east rhumb line 21. And the lower left hand quadrant is provided with a ninety degree scale reading clockwise from 0 at the south rhumb line 22 to 90 at the west rhumb line 23.

In addition to the graduated scales of the quadrants, the face of the protractor body may also include, inscribed on marginal portions of the opening 11 outwardly of the quadrant scales, extended scale graduations reading clockwise in degrees of a circle from zero at the north rhumb line 20 three hundred and sixty degrees around said opening 11 back to said north rhumb line.

Selected side marginal portions of the protractor body may be provided therealong with suitably graduated proportional or other lineal scales.

The rotor member may be provided in suitable disposition along its circumferential marginal portion with a vernier scale (not shown) for cooperation with the quadrant or circular degree scales of the protractor body.

In use, the operation of the novel plotting instrument of this invention is somewhat analogous to the operation of a surveyor's transit, since the graduated quadrant scales around the perimeter of the protractor body opening 11 function similarly to the horizontal limb of a transit, the diametric ruling or straight edge 13 of the rotor member 12 functions similarly to the telescope of the transit, and the center point or notch 14 in said ruling or straight edge of the rotor member functions similarly to the plumb-bob of the transit.

Figure 3:
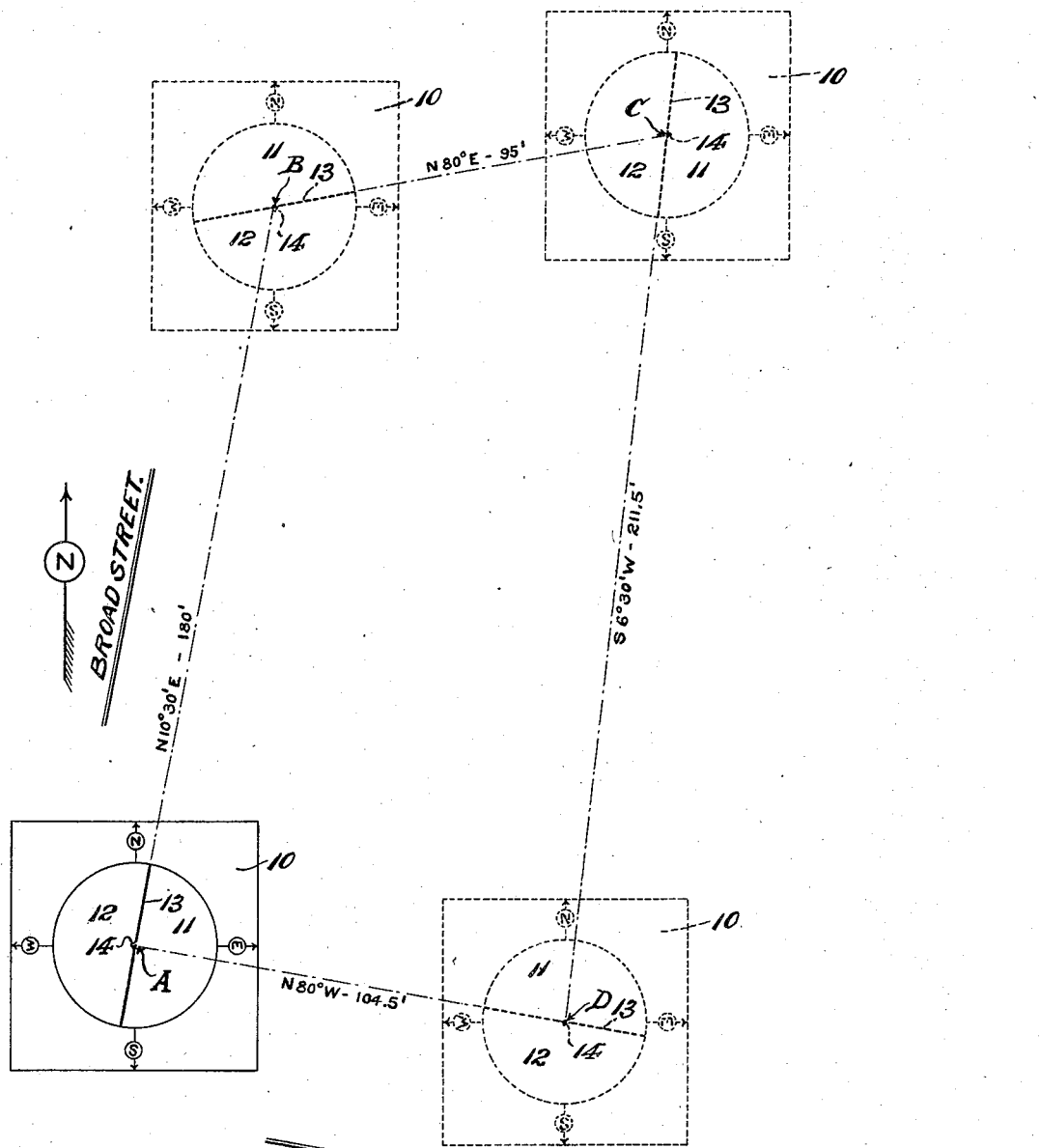
Fig. 3 is a schematic view illustrating one way in which the instrument may be used for determining angles and bearings desired to be plotted.

By means of the novel plottting instrument, bearings and angles can be plotted directly merely by adjusting the rotor member around a take-off point, with which the center point or notch 14 is registered, so as to align its ruling or straight edge 13 with a selected bearing and angle indication of the quadrant scales. It will be obvious that bearings and angles can be carried from point to point, and plotted with little risk of error. By reason of this, bearings may be conveniently, rapidly and accurately plotted directly from surveyor's notes, land deed descriptions and the like. Illustrative of such use of the instrument, the method of operating the same is shown in Fig. 3, for plotting, by way of example, a land deed description reading as follows:

Beginning at a point on the north side of Main Street, said point being 40 feet easterly from Broad Street. Thence (1) north 10° 30′ east 180 feet to a point. Thence (2) north 80° east 95 feet to a point. Thence (3) south 6° 30′ west 211.5 feet to north side of Main Street. Thence (4) north 80° west 104.5 feet to point of beginning.

To plot the above description, the starting point A is placed on the lower left hand corner portion of the paper, with north pointing toward the top of the paper and preferably on a line perpendicular to the base or bottom edge of the paper. Point A being thus established, the protractor body is placed over the same with its north-south rhumbs perpendicular, and with the center point or notch 14 of the rotor member registered over said point A, whereupon the rotor member is turned clockwise to align the ruling or straight edge 13 with the north by east quadrant scale at the 10° 30′ graduation thereof. By running a pencil point along the ruling or straight edge 13 of the thus adjusted rotor member a bearing line of proper angularity is produced and may then be extended for a suitably proportionally scaled distance indicative of 180 feet, thereby completing the first course of the description and establishing the terminal point B. The instrument is now shifted to point B and centered thereover in similar manner, thereupon again adjusting the rotor member counter-clockwise to align the ruling or straight edge 13 with the north by east quadrant scale at the 80° graduation thereof, whereupon the second bearing line is inscribed and extended for a distance indicative of 95 feet, thereby completing the second course of the description and establishing the terminal point C. Again the instrument is shifted and centered over point C, and the rotor member is again adjusted clockwise to align the ruling or straight edge 13 with the south by west quadrant scale at the 6° 30′ graduation thereof, whereupon the third bearing line is inscribed and extended for a distance indicative of 211.5 feet, thereby completing the third course of the description and establishing the terminal point D. Again the instrument is shifted and centered over point D, and the rotor member is again adjusted counter-clockwise to align the ruling or straight edge 13 with the north by west quadrant scale at the 80° graduation thereof, whereupon the fourth and last bearing line is inscribed and extended for a distance indicative of 104–5 feet, thereby completing the fourth and last course of the description back to point A, the place of beginning.

From the above the advantage of the instrument can be readily understood, for by observing and maintaining the position of the protractor body with its north-south rhumbs disposed perpendicular in every position, the axis of the body is maintained in the same relative position to the meridian regardless of the number of courses required to be plotted. Maintenance of such relative position to the meridian may be assisted by supporting the protractor body on a T-square. Furthermore the bearings can be plotted directly without calculating interior and exterior angles, thus reducing risk of error, while at the same time affording means for quickly detecting any error in a land deed or like description which can be shown by plotting.

It will be obvious that the novel plotting instrument may also be used for plotting bearings and angles in charting marine and air navigation courses by regarding north as zero axis, and then successively adjusting the rotor member clockwise or counter-clockwise around the 360 degree scale from point to point until the traverse is completed.

Modification of the graduated scales to adapt the same to special uses in addition to those above mentioned may be made.

Having described my invention, I claim:

1. A plotting instrument comprising a calibrated protractor body having a central circular opening provided with a guide channel extending around the periphery thereof, a rotor member having a diametric straight edge and a semi-circular circumferential edge conformably shaped to slidably engage in said guide channel, a semi-circular keeper spring slidably engaged in said guide channel in opposition to said rotor member and with its ends bearing thrustingly against the respective end portions of the rotor member straight edge, and said spring having intermediate its ends a finger loop projecting therefrom freely into the interior of said protractor body opening, whereby to be manipulatable for imparting rotary movement to said spring and rotor member.

2. A plotting instrument comprising a calibrated protractor body having a central circular opening provided with a guide channel extending around the periphery thereof, a rotor member having a diametric straight edge and a semi-circular circumferential edge conformably shaped to slidably engage in said guide channel, a semi-circular keeper spring slidably engaged in said guide channel in opposition to said rotor member, said spring terminating at its opposite ends in angular foot pieces adapted to bear thrustingly against the respective end portions of the rotor member straight edge, and said spring having intermediate its ends a finger loop projecting therefrom freely into the interior of said protractor body opening, whereby to be manipulatable for imparting rotary movement to said spring and rotor member.

GEORGE C. STEWART.

REFERENCES CITED

The following references are of record in the file of this patent:

UNITED STATES PATENTS

| Number | Name | Date |
| --- | --- | --- |
| 873,524 | English | Dec. 10, 1907 |
| 1,154,673 | Van Ness | Sept. 28, 1915 |
| 224,811 | Wilson | Feb. 24, 1880 |
| 570,977 | Belcher | Nov. 10, 1896 |
| 1,062,740 | Sharpe | May 27, 1913 |